IRVING F. WILCOX.

Improvement in Basket Splints.

No. 121,304.  Patented Nov. 28, 1871.

UNITED STATES PATENT OFFICE.

IRVING F. WILCOX, OF STREETSBOROUGH, OHIO.

IMPROVEMENT IN BASKET-SPLINTS.

Specification forming part of Letters Patent No. 121,304, dated November 28, 1871.

*To all whom it may concern:*

Be it known that I, IRVING F. WILCOX, of Streetsborough, county of Portage, State of Ohio, have invented an Improvement in Basket-Splints, of which the following is a specification:

My invention relates to an improvement in the material from which baskets are made; and consists in cutting the splint from a log in concentric circles, thus following the grain of the wood and producing an article of great beauty, elasticity, and pliability, capable of being worked into nearly all the forms of baskets now in use, and which is produced at an exceedingly low rate, thus reducing the cost of material to the basket-maker, as well as that of the finished article to the general public.

Figure 1:
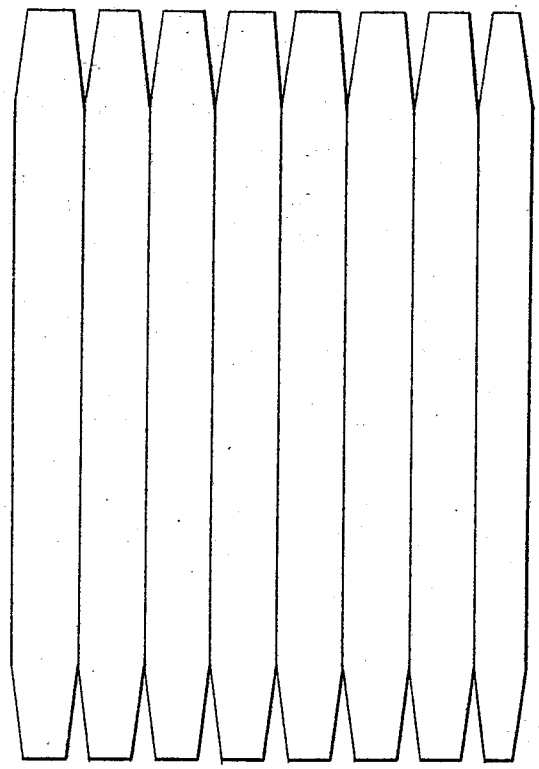
Figures 2, 3:
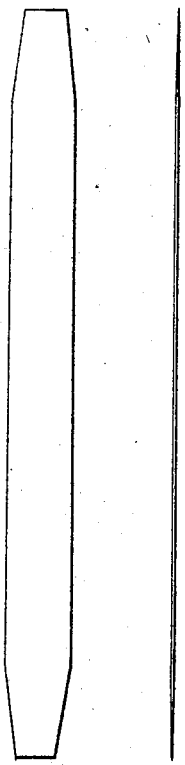

Figure 1 is a view of the sheets of the material as cut from the log, the dotted lines showing how it is divided. Fig. 2 is one of the splints prepared for use. Fig. 3 is an edge view of the same.

In producing my improved splint, I take a log of suitable timber free from knots, and of a length corresponding to that of the splints to be manufactured, and place it in a machine similar to those used for cutting veneers, but provided with an additional reciprocating knife of proper form, which trims the splints to the size and shape desired. I am thus enabled to furnish the trade with a very superior article having a fine surface upon one side, of even thickness and strength, and at a much less cost than they can be produced by any of the various methods in ordinary use.

Having thus described my invention, what I claim as new, and desire to secure by Letters Patent of the United States, is—

As an article of manufacture, a basket-splint produced in the manner specified.

I. F. WILCOX.

Witnesses:
D. T. PIERCE,
M. H. CHANDLER.

(169)